(12) United States Patent
Watanabe et al.

(10) Patent No.: US 12,163,032 B2
(45) Date of Patent: Dec. 10, 2024

(54) COMPOSITE PARTICLES AND METHOD FOR PRODUCING COMPOSITE PARTICLES

(71) Applicant: NISSHIN ENGINEERING INC., Tokyo (JP)

(72) Inventors: Shu Watanabe, Fujimino (JP); Naohito Uemura, Fujimino (JP); Keitaroh Nakamura, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 108 days.

(21) Appl. No.: 16/954,853

(22) PCT Filed: Dec. 6, 2018

(86) PCT No.: PCT/JP2018/044926
§ 371 (c)(1),
(2) Date: Jun. 17, 2020

(87) PCT Pub. No.: WO2019/124100
PCT Pub. Date: Jun. 27, 2019

(65) Prior Publication Data
US 2021/0087404 A1    Mar. 25, 2021

(30) Foreign Application Priority Data
Dec. 19, 2017   (JP) .................................. 2017-242608

(51) Int. Cl.
*C09C 3/06*        (2006.01)
*C01B 21/076*    (2006.01)
(Continued)

(52) U.S. Cl.
CPC ............ *C09C 3/066* (2013.01); *C01B 21/076* (2013.01); *C01G 25/00* (2013.01); *C01G 25/006* (2013.01);
(Continued)

(58) Field of Classification Search
None
See application file for complete search history.

(56) References Cited

U.S. PATENT DOCUMENTS

2005/0175836 A1*   8/2005   Kuehnle ................... C09C 1/00
                                                                428/404
2015/0275348 A1   10/2015   Joesaar et al.
(Continued)

FOREIGN PATENT DOCUMENTS

CN    103619771 A    3/2014
CN    103985852 A    8/2014
(Continued)

OTHER PUBLICATIONS

Yin et al ("Synthesis of ZrN powders by aluminum-reduction nitridation of ZrO2 powders with CaCO3 additive", Cera Inter 43 (2017) 3183-3189 available online Nov. 22, 2016). (Year: 2016).*
(Continued)

*Primary Examiner* — Michael Forrest
(74) *Attorney, Agent, or Firm* — Muncy, Geissler, Olds & Lowe, P.C.

(57) ABSTRACT

Provided are composite particles having the optical characteristic of a lower transmittance in the visible light region, i.e., a higher light-blocking performance in the visible light region, and a method for producing composite particles. The composite particles have at least one of Al and Ti formed into a composite with ZrN.

5 Claims, 3 Drawing Sheets

(51) Int. Cl.
  *C01G 25/00* (2006.01)
  *C09C 1/00* (2006.01)
  *C23C 4/10* (2016.01)
  *C23C 4/134* (2016.01)
(52) U.S. Cl.
  CPC ............... *C09C 1/00* (2013.01); *C23C 4/10* (2013.01); *C23C 4/134* (2016.01)

(56) References Cited

U.S. PATENT DOCUMENTS

| | | | |
|---|---|---|---|
| 2016/0215383 A1* | 7/2016 | Park | C23C 14/0641 |
| 2017/0197843 A1 | 7/2017 | Kinoshita | |
| 2017/0253531 A1 | 9/2017 | Moroguchi et al. | |

FOREIGN PATENT DOCUMENTS

| | | | |
|---|---|---|---|
| CN | 105821385 A | | 8/2016 |
| CN | 106458628 A | | 2/2017 |
| CN | 104093881 B | | 3/2017 |
| CN | 106795059 A | | 5/2017 |
| JP | S-48-80108 | | 10/1973 |
| JP | H11302078 A | * | 11/1999 |
| JP | 4931011 B2 | | 5/2012 |
| JP | 2015227282 A | | 12/2015 |
| WO | WO-2019/124100 A1 | | 6/2019 |

OTHER PUBLICATIONS

Machine Translation of J-H11302078 (Year: 1999).*
Iwama et al., "Growth Of Ultrafine Particles Of Transition Metal Nitrides By The Reactive Gas Evaporation Technique With Electron Beam Heating;" Journal of Crystal Growth, (1984) vol. 66, pp. 189-194.
Ikeda et al., "Preparation Of Ultrafine Zirconium Nitride Powders From Zirconia By Reduction With Magnesium," Journal of the Ceramic Association, Japan 93 [9] (1985) 505.
Kamiyama et al., "Preparation of Zirconium Nitrude Powder from Zirconium Chloride(IV)," Journal of the Ceramic Association, Japan; 1984, vol. 92, pp. 29-34.
An Office Action from corresponding CN application No. 20188007972.9 dated Oct. 26, 2022, 10 pages.
Tang et al., (Jan. 24, 2013). *Densification and mechanical properties of hot-pressed ZrN ceramics doped with Zr or Ti*. Journal of The European Ceramic Society, 33 pages, pp. 1363-1371.

* cited by examiner

COMPOSITE PARTICLES AND METHOD FOR PRODUCING COMPOSITE PARTICLES

TECHNICAL FIELD

The present invention relates to composite particles of zirconium nitride and a method for producing the composite particles, particularly to composite particles of zirconium nitride characterized in its optical properties and a method for producing the composite particles.

BACKGROUND ART

At present, various types of fine particles are used in various applications. For instance, fine particles such as metal fine particles, oxide fine particles, nitride fine particles and carbide fine particles have been used in electrical insulation materials for various electrical insulation parts, cutting tools, materials for machining tools, functional materials for sensors, sintered materials, electrode materials for fuel cells, and catalysts.

Patent Literature 1 describes black composite particles having high light-shielding performance suitable as a black component such as a black matrix in a color filter. The black composite particles are black composite particles comprising titanium nitride particles and metal fine particles and represented by the composition formula: TiNxOy·zX (wherein Ti is a titanium atom; N is a nitrogen atom; O is an oxygen atom; X is a metal atom; x is the number greater than 0 and less than 2; y is the number not less than 0 and less than 2; and z is the number greater than 0 and less than 10).

Non-patent Literature 1 describes the growth of ultrafine particles of transition metal nitrides by the reactive gas evaporation technique with electron beam heating and mentions ZrN fine particles of 2 to 10 nm. Patent Literature 2 describes a fine particulate lower zirconium oxide-zirconium nitride composite that exhibits a peak of lower zirconium oxide and a peak of zirconium nitride in its X-ray diffraction profile and has a specific surface area of 10 to 60 $m^2/g$.

Non-patent Literature 2 describes ZrN powder synthesized from $ZrO_2$ by Mg reduction in the temperature range of 500° C. to 1100° C. under a nitrogen gas flow (150 to 200 ml/min). Further, in Non-patent Literature 2, ZrN powder was confirmed to be ZrN of single phase through an X-ray diffraction experiment.

CITATION LIST

Patent Literature
  Patent Literature 1: JP 2015-227282 A
  Patent Literature 2: JP 4931011 B
Non-Patent Literature
  Non-patent Literature 1: Saburo IWAMA, Kenji HAYAKAWA and Tetsuya ARIZUMI, GROWTH OF ULTRAFINE PARTICLES OF TRANSITION METAL NITRIDES BY THE REACTIVE GAS EVAPORATION TECHNIQUE WITH ELECTRON BEAM HEATING, Journal of Crystal Growth 66 (1984) 189-194
  Non-patent Literature 2: Tsutomu IKEDA, Toshiyuki MORI, Fumio NOGUCHI, Takeaki IIDA and Takashi MITAMURA, PREPARATION OF ULTRAFINE ZIRCONIUM NITRIDE POWDERS FROM ZIRCONIA BY REDUCTION WITH MAGNESIUM, Journal of the Ceramic Association, Japan 93 [9] (1985) 505

SUMMARY OF INVENTION

Technical Problems

As described above, various types of fine particles are used in various applications, and black composite particles composed of titanium nitride particles and metal fine particles are proposed as in Patent Literature 1 above. Further, ZrN fine particles are known as described in Non-patent Literatures 1 and 2. It is known as the characteristics of ZrN (zirconium nitride) fine particles that the transmittance is high in the Ultraviolet range and low in the visible light range of 400 to 800 nm in wavelength. However, a single-phase zirconium nitride as in Patent Literature 2 is industrially not obtainable under the current circumstances. Further, fine particles are required to have a wider range of applications and to have more functions under the current circumstances, and now, fine particles are required to have lower transmittance in the visible light range, that is, higher light-shielding properties in the visible light range while maintaining high transmittance in the Ultraviolet range, compared to the optical characteristics of a single-phase zirconium nitride.

An object of the present invention is to provide composite particles having such optical characteristics as lower transmittance in the visible light range, i.e., higher light-shielding properties in the visible light range, as well as a method for producing the composite particles.

Solution to Problems

In order to attain the above object, the present invention provides composite particles in which ZrN is combined with at least one of Al and Ti.

Preferably, when the ZrN is combined with the Al, a content of the Al is 0.1 to 9 wt %.

Preferably, when the ZrN is combined with the Ti, a content of the Ti is 0.1 to 9 wt %.

Preferably, when the ZrN is combined with the Al and the Ti, a content of the Al and a content of the Ti are each 0.1 to 4 wt %.

The present invention also provides a method for producing composite particles in which ZrN is combined with at least one of Al and Ti, wherein the composite particles are produced using powder of zirconium nitride and powder of at least one of Al and Ti as raw material powder by means of a gas-phase process.

Preferably, the gas-phase process is a thermal plasma process, a flame process, an arc plasma process, a microwave heating process or a pulsed wire process.

Preferably, the thermal plasma process involves a step of supplying a carrier gas having the raw material powder dispersed therein to a thermal plasma flame and a step of supplying gas for cooling to a terminating portion of the thermal plasma flame to thereby produce the composite particles.

Preferably, the thermal plasma flame is derived from at least one of argon gas and nitrogen gas.

Advantageous Effects of Invention

The present invention makes it possible to provide composite particles having such optical characteristics as lower transmittance in the visible light range, i.e., higher light-shielding properties in the visible light range.

DESCRIPTION OF EMBODIMENTS

On the following pages, composite particles of the present invention are described in detail with reference to a preferred embodiment shown in the accompanying drawings.

Figure 1:
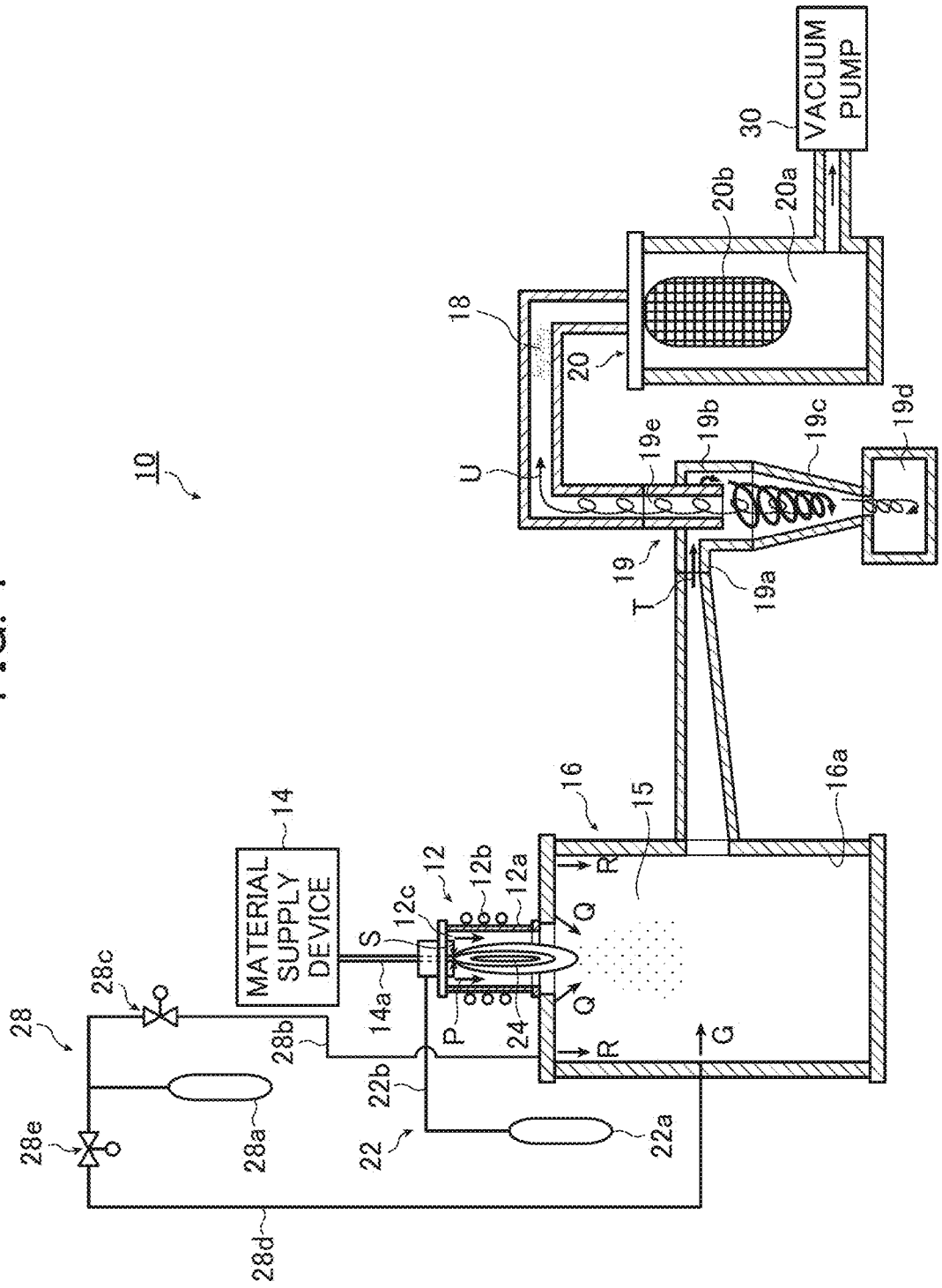
FIG. 1 is a schematic view showing an example of a fine particle production apparatus that is used in a method for producing composite particles according to an embodiment of the invention.

FIG. 1 is a schematic view showing an example of a fine particle production apparatus that is used in a method for producing composite particles according to an embodiment of the invention.

A fine particle production apparatus 10 (hereinafter referred to simply as "production apparatus 10") shown in FIG. 1 is used to produce composite particles of zirconium nitride.

The composite particles are particles obtained by combining ZrN with at least one of Al and Ti. The composite particles refer not to particles in which various types of nitride particles such as compounds ZrN, TiN and AlN are mixed and individually present but to nitride particles in which ZrN and at least one of Al and Ti are contained in each particle.

The forms of Al and Ti in the composite particles are not particularly limited, and Al and Ti may be in the form of not only a simple metal but also compounds such as a nitride, an oxide, an oxynitride, a non-stoichiometric oxide and a non-stoichiometric nitride.

The composite particles are those called nanoparticles and may have a particle size of 1 to 100 nm. The particle size is the average particle size measured using the BET method. The composite particles are, for example, produced by a production method described later, are obtained not in a dispersed form in a solvent or the like but in a particulate form, and are present as composite particles alone. Therefore, there is no particular limitation on the combination of a solvent and the like, and the degree of freedom is high in selection of a solvent.

In the composite particles, when ZrN is combined with Al, the Al content is preferably 0.1 to 9 wt %. With the Al content within the above range, the transmittance in the visible light range becomes lower, thus providing higher light-shielding properties in the visible light range, as described later.

In the composite particles, when ZrN is combined with Ti, the Ti content is preferably 0.1 to 9 wt %. With the Ti content within the above range, the transmittance in the visible light range becomes lower, thus providing higher light-shielding properties in the visible light range, as described later.

In the composite particles, when ZrN is combined with Al and Ti, the Al content and the Ti content are each preferably 0.1 to 4 wt %. With the Al content and the Ti content each within the above range, the transmittance in the visible light range becomes lower, thus providing higher light-shielding properties in the visible light range, as described later.

The contents (wt %) of the respective elements above can be determined by XRF (X-ray fluorescence spectrometry), and the contents (wt %) of the respective elements are obtained with impurities being removed.

Specifically, in the case of the Al content, the Al content is the percentage by mass of Al when the contents (wt %) of the other elements than Zr and Al are omitted from the contents (wt %) of all the elements measured by XRF (X-ray fluorescence spectrometry) and the total percentage by mass of Zr and Al are defined as 100.

The production apparatus 10 includes a plasma torch 12 generating thermal plasma, a material supply device 14 supplying raw material powder of the composite particles into the plasma torch 12, a chamber 16 serving as a cooling tank for use in producing primary fine particles 15 of the composite particles, a cyclone 19 removing, from the produced primary fine particles 15 of the composite particles, coarse particles having a particle size equal to or larger than an arbitrarily specified particle size, and a collecting section 20 collecting secondary fine particles 18 of the composite particles having a desired particle size as obtained by classification by the cyclone 19.

Various devices in, for example, JP 2007-138287 A may be used for the material supply device 14, the chamber 16, the cyclone 19 and the collecting section 20. The primary fine particles 15 of the composite particles are also simply called primary fine particles 15.

In this embodiment, for example, powder of zirconium nitride (ZrN), and powder of at least one of Al and Ti are used as the raw material powder in the manufacture of the composite particles. For instance, nanosized composite particles of zirconium nitride (ZrN) with a particle size of 1 to 100 nm are obtained from the foregoing raw material powder.

The average particle sizes of zirconium nitride (ZrN) powder, Al powder and Ti powder used as the raw material powder are appropriately set to allow easy evaporation in a thermal plasma flame and are each not more than 100 μm for example, preferably not more than 10 μm, and even more preferably not more than 5 μm.

The plasma torch 12 is constituted of a quartz tube 12a and a coil 12b for high frequency oscillation surrounding the outside of the quartz tube. A supply tube 14a to be described later which is for supplying raw material powder of the composite particles into the plasma torch 12 is provided on the top of the plasma torch 12 at the central part thereof. A plasma gas supply port 12c is formed in the peripheral portion of the supply tube 14a (on the same circumference). The plasma gas supply port 12c is in a ring shape.

A plasma gas supply source 22 is configured to supply plasma gas into the plasma torch 12 and for instance has a gas supply section 22a. The gas supply section 22a is connected to the plasma gas supply port 12c through piping 22b. Although not shown, the gas supply section 22a is provided with a supply amount adjuster such as a valve for adjusting the supply amount. Plasma gas is supplied from the plasma gas supply source 22 into the plasma torch 12 through the plasma gas supply port 12c of ring shape in the direction indicated by arrow P and the direction indicated by arrow S.

For example, mixed gas of argon gas and nitrogen gas is used as plasma gas. The thermal plasma flame is derived from at least one of argon gas and nitrogen gas.

At least one of argon gas and nitrogen gas is stored in the gas supply section 22a. At least one of argon gas and nitrogen gas is supplied from the gas supply section 22a of the plasma gas supply source 22 into the plasma torch 12 in the direction indicated by arrow P and the direction indicated by arrow S after passing through the plasma gas supply port 12c via the piping 22b. At least one of argon gas and nitrogen gas may be solely supplied in the direction indicated by arrow P.

When a high frequency voltage is applied to the coil 12b for high frequency oscillation, thermal plasma flame 24 is generated in the plasma torch 12.

It is necessary for the thermal plasma flame 24 to have a higher temperature than the boiling point of the raw material powder. A higher temperature of the thermal plasma flame 24 is more preferred because the raw material powder is more easily converted into a gas phase state; however, there is no particular limitation on the temperature. For instance, the thermal plasma flame 24 may have a temperature of 6,000° C., and in theory, the temperature is deemed to reach around 10,000° C.

The ambient pressure inside the plasma torch 12 is preferably up to atmospheric pressure. The ambient pressure of up to atmospheric pressure is not particularly limited and is, for example, in the range of 0.5 to 100 kPa.

While, for example, at least one of argon gas and nitrogen gas is used as the plasma gas, the invention is not limited thereto, and use may be made of the combination of at least one of argon gas and nitrogen gas with helium gas or the combination of at least one of argon gas and nitrogen gas with hydrogen gas.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

The material supply device 14 is connected to the top of the plasma torch 12 through the supply tube 14a. The material supply device 14 is configured to, for instance, supply the raw material powder in a powdery form into the thermal plasma flame 24 in the plasma torch 12.

For example, the device disclosed in JP 2007-138287 A may be used as the material supply device 14 which supplies the raw material powder in a powdery form. In this case, the material supply device 14 includes, for example, a storage tank (not shown) storing the raw material powder, a screw feeder (not shown) transporting the raw material powder in a fixed amount, a dispersion section (not shown) dispersing the raw material powder transported by the screw feeder to convert it into the form of primary particles before the raw material powder is finally sprayed, and a carrier gas supply source (not shown).

Together with a carrier gas to which a push-out pressure is applied from the carrier gas supply source, the raw material powder is supplied into the thermal plasma flame 24 in the plasma torch 12 through the supply tube 14a.

The configuration of the material supply device 14 is not particularly limited as long as the device can prevent the raw material powder from agglomerating, thus making it possible to spray the raw material powder in the plasma torch 12 with the dispersed state maintained. Inert gas such as argon gas is used as the carrier gas, for example. The flow rate of the carrier gas can be controlled using a flowmeter such as a float type flowmeter. The flow rate value of the carrier gas refers to a reading on the flowmeter.

The chamber 16 is provided below and adjacent to the plasma torch 12, and a gas supply device 28 is connected to the chamber 16. The primary fine particles 15 of the composite particles are produced in the chamber 16. The chamber 16 also serves as a cooling tank.

The gas supply device 28 is configured to supply cooling gas and nitriding gas into the chamber 16. The gas supply device 28 includes a gas supply source 28a, piping 28b and piping 28d. The piping 28b is provided to supply cooling gas into the chamber 16. The piping 28b has a pressure control valve 28c which controls the amount of gas supplied from the gas supply source 28a. The piping 28d is provided to supply nitriding gas into the chamber 16. The piping 28d has a pressure control valve 28e which controls the amount of gas supplied from the gas supply source 28a. The cooling gas is also called gas for cooling.

The gas supply device 28 further includes a pressure application means (not shown) such as a compressor or a blower which applies push-out pressure to the cooling gas to be supplied into the chamber 16. The cooling gas and the nitriding gas are supplied from the gas supply source 28a through the piping 28b and the piping 28d, respectively, by means of the pressure application means.

For instance, at least one of argon gas and nitrogen gas is stored in the gas supply source 28a. The cooling gas is at least one of argon gas and nitrogen gas, and the nitriding gas is nitrogen gas.

The gas supply device 28 supplies at least one of argon gas and nitrogen gas as the cooling gas at, for example, 45 degrees in the direction of arrow Q toward a tail portion of the thermal plasma flame 24, i.e., the end of the thermal plasma flame 24 on the opposite side from the plasma gas supply port 12c, that is, a terminating portion of the thermal plasma flame 24, and also supplies the cooling gas from above to below along an inner wall 16a of the chamber 16, that is, in the direction of arrow R shown in FIG. 1.

The cooling gas supplied from the gas supply device 28 into the chamber 16 rapidly cools the raw material powder having been converted to a gas phase state through the thermal plasma flame 24, thereby obtaining the primary fine particles 15 of the composite particles. Besides, the cooling gas has additional functions such as contribution to classification of the primary fine particles 15 in the cyclone 19.

When the primary fine particles 15 of the composite particles having just been produced collide with each other to form agglomerates, this causes nonuniform particle size, resulting in lower quality. However, dilution of the primary fine particles 15 with the cooling gas supplied in the direction of arrow Q toward the tail portion (terminating portion) of the thermal plasma flame prevents the fine particles from colliding with each other to agglomerate together.

In addition, the cooling gas supplied in the direction of arrow R prevents the primary fine particles 15 from adhering to the inner wall 16a of the chamber 16 in the process of collecting the primary fine particles 15, whereby the yield of the produced primary fine particles 15 is improved.

Further, nitrogen gas is supplied as the nitriding gas in the direction of arrow G shown in FIG. 1. Owing to this, nitrogen is further supplied to the primary fine particles 15, leading to stable nitriding. When nitrogen gas is used as the cooling gas and nitriding is sufficient due to the cooling gas to obtain the composite particles, then the nitriding gas is not necessarily required.

The cooling gas and the nitriding gas may be the same or different. When the cooling gas and the nitriding gas are different, gas supply sources 28a are provided separately for the cooling gas and the nitriding gas.

As shown in FIG. 1, the cyclone 19 is provided to the chamber 16 to classify the primary fine particles 15 of the composite particles based on a desired particle size. The cyclone 19 includes an inlet tube 19a which supplies the primary fine particles 15 from the chamber 16, a cylindrical outer tube 19b connected to the inlet tube 19a and positioned at an upper portion of the cyclone 19, a truncated conical part 19c continuing downward from the bottom of the outer tube 19b and having a gradually decreasing diameter, a coarse particle collecting chamber 19d connected to the bottom of the truncated conical part 19c for collecting coarse particles having a particle size equal to or larger than the above-mentioned desired particle size, and an inner tube 19e connected to the collecting section 20 to be detailed later and projecting from the outer tube 19b.

A gas stream containing the primary fine particles 15 is blown in from the inlet tube 19a of the cyclone 19 along the inner peripheral wall of the outer tube 19b, and this gas stream flows in the direction from the inner peripheral wall of the outer tube 19b toward the truncated conical part 19c as indicated by arrow T in FIG. 1, thus forming a downward swirling stream.

When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged to the outside of the system through the inner tube 19e along with the upward stream on the inner wall of the truncated conical part 19c.

The apparatus is configured such that a negative pressure (suction force) is exerted from the collecting section 20 to be detailed later through the inner tube 19e. The apparatus is also configured such that, under the negative pressure (suction force), the composite particles separated from the swirling gas stream are sucked as indicated by arrow U and sent to the collecting section 20 through the inner tube 19e.

On the extension of the inner tube 19e which is an outlet for the gas stream in the cyclone 19, the collecting section 20 is provided to collect the secondary fine particles 18 (composite particles) having a desired particle size on the order of nanometers. The collecting section 20 includes a collecting chamber 20a, a filter 20b provided in the collecting chamber 20a, and a vacuum pump 30 connected through a pipe provided at a lower portion of the collecting chamber 20a. The fine particles sent from the cyclone 19 are sucked by the vacuum pump 30 to be drawn into the collecting chamber 20a, remain on the surface of the filter 20b, and collected.

It should be noted that the number of cyclones used in the production apparatus 10 is not limited to one but may be two or more.

Next, an example of the method for producing composite particles is explained using the foregoing production apparatus 10.

First, powder of zirconium nitride (ZrN), and powder of at least one of Al and Ti are prepared as the raw material powder of the composite particles. The raw material powder is put in the material supply device 14.

The raw material powder is suitably determined depending on the composite particles to be produced. Examples of the raw material powder include the combination of ZrN powder and Al powder, the combination of ZrN powder and Ti powder, and the combination of ZrN powder, Al powder and Ti powder.

For the raw material powder, the particle size of each powder is suitably determined depending on the production method and other factors, and when a thermal plasma flame is used as described above, the average particle size is for example not more than 100 μm, preferably not more than 10 μm, and more preferably not more than 5 μm in order to allow easy evaporation of the powder in the thermal plasma flame.

For example, using at least one of argon gas and nitrogen gas as the plasma gas, a high frequency voltage is applied to the coil 12b for high frequency oscillation to generate the thermal plasma flame 24 in the plasma torch 12.

Further, for example, at least one of argon gas and nitrogen gas is supplied as the cooling gas in the direction of arrow Q from the gas supply device 28 to the tail portion of the thermal plasma flame 24, i.e., the terminating portion of the thermal plasma flame 24. At this time, at least one of argon gas and nitrogen gas is supplied as the cooling gas also in the direction of arrow R. Further, nitrogen gas is supplied as the nitriding gas in the direction of arrow G.

Next, the raw material powder is transported with gas, for example, argon gas used as the carrier gas and supplied to the thermal plasma flame 24 in the plasma torch 12 through the supply tube 14a. The raw material powder supplied are evaporated in the thermal plasma flame 24 to be converted into a gas phase state, reacts with nitrogen to be nitrided, and is rapidly cooled with the cooling gas (gas for cooling), thereby obtaining the primary fine particles 15 of the composite particles of zirconium nitride. Further, a sufficient amount of nitrogen is supplied to the primary fine particles 15 owing to the nitriding gas, which leads to stable nitriding; therefore, the composite particles of zirconium nitride can be stably obtained.

The method for producing composite particles involving the step of supplying a carrier gas having raw material powder dispersed therein to a thermal plasma flame and the step of supplying gas for cooling to the terminating portion of the thermal plasma flame to thereby produce composite particles as described above, is called a thermal plasma process.

The primary fine particles 15 of the composite particles thus obtained in the chamber 16 are blown in through the inlet tube 19a of the cyclone 19 together with a gas stream along the inner peripheral wall of the outer casing 19b, and this gas stream flows along the inner peripheral wall of the outer casing 19b as indicated by arrow T in FIG. 1, thus forming a swirling stream which goes downward. When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged from the inner wall to the outside of the system along with the upward stream on the inner wall of the truncated conical part 19c.

Due to the negative pressure (suction force) applied by the vacuum pump 30 through the collecting section 20, the discharged secondary fine particles 18 (composite particles) of zirconium nitride (ZrN) are sucked in the direction indicated by arrow U in FIG. 1 and sent to the collecting section 20 through the inner tube 19e to be collected on the filter 20b of the collecting section 20. The internal pressure of the cyclone 19 at this time is preferably equal to or lower than the atmospheric pressure. For the particle size of the secondary fine particles 18 (composite particles), an arbitrary particle size on the order of nanometers is specified according to the intended purpose.

The composite particles of zirconium nitride (ZrN) can be thus obtained easily and reliably by merely subjecting powder of zirconium nitride (ZrN) and powder of at least one of Al and Ti to plasma treatment.

Furthermore, the composite particles produced by the method for producing composite particles according to this embodiment have a narrow particle size distribution, in other words, have a uniform particle size, and coarse particles of 1 μm or more are hardly included.

The ratio between powder of ZrN and powder of at least one of Al and Ti used as the raw material powder is suitably determined depending on the composition of the composite particles to be finally obtained. For the ratio above, for instance, the composition to be finally obtained and the ratio of powder of Ti and powder of Al to powder of ZrN are determined in advance. Composite particles with a predetermined composition can be obtained using the previously determined ratio.

While the primary fine particles of the composite particles are formed using a thermal plasma flame by the thermal plasma process, the primary fine particles of the composite particles may be formed by a gas-phase process. Thus, the method for producing the primary fine particles of the composite particles is not limited to the thermal plasma process using a thermal plasma flame as long as it is the gas-phase process, and may alternatively be one using a flame process, an arc plasma process, a microwave heating process or a pulsed wire process.

The flame process herein is a method of synthesizing composite particles by using a flame as the heat source and putting raw material powder in a gas phase or a liquid phase through the flame. In the flame process, the raw material powder in a gas or liquid phase state is supplied to flame, and then cooling gas is supplied to the flame to decrease the flame temperature, thus obtaining the primary fine particles 15 of the composite particles.

The raw material powder in a gas phase state is, for example, raw material powder dispersed in carrier gas as described above. The raw material powder in a liquid phase state is raw material powder dispersed in a solvent.

For the cooling gas, the same gas as that used for the thermal plasma flame described above can be used. Also for the raw material powder, the same powder as that used for the thermal plasma flame described above can be used. Examples of the raw material powder that may be used include the combination of ZrN powder and Al powder, the combination of ZrN powder and Ti powder, and the combination of ZrN powder, Al powder and Ti powder.

Next, the composite particles of zirconium nitride (ZrN) is described.

As described above, the composite particles of zirconium nitride (ZrN) according to the invention are those called nanoparticles having a particle size of 1 to 100 nm. The particle size is the average particle size measured using the BET method.

Figure 2:
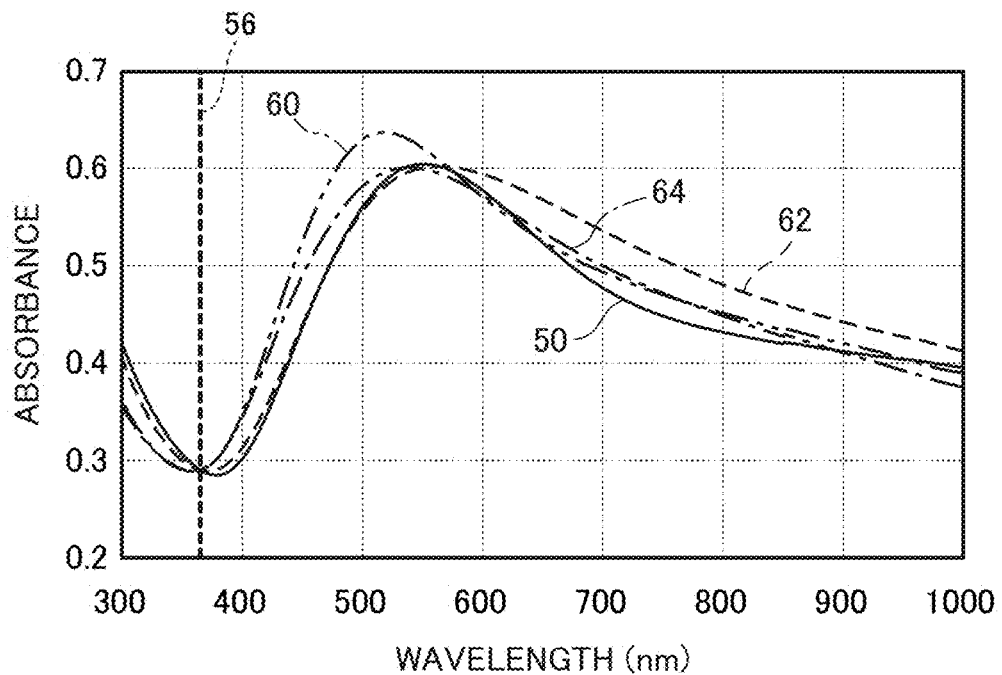
FIG. 2 is a graph showing absorbances of fine particles of zirconium nitride, composite particles of zirconium nitride and aluminum, composite particles of zirconium nitride and titanium, and composite particles of zirconium nitride, aluminum and titanium.

The optical characteristics of the composite particles of zirconium nitride are described. FIG. 2 is a graph showing absorbances of fine particles of zirconium nitride, composite particles of zirconium nitride and aluminum, composite particles of zirconium nitride and titanium, and composite particles of zirconium nitride, aluminum and titanium. In FIG. 2, the horizontal axis indicates the wavelength, and the vertical axis indicates the absorbance. The absorbances represented by measurement lines in FIG. 2 were normalized by the absorbance values at the i-line (wavelength of 365 nm) to be described later. In FIG. 2, numeral 56 is given to the line representing the wavelength of 365 nm. The wavelength of 365 nm is a wavelength in the Ultraviolet range, which is called i-line.

The absorbances are values obtained by separately dispersing fine particles of zirconium nitride (ZrN fine particles), composite particles of zirconium nitride and aluminum (ZrN+Al composite particles), composite particles of zirconium nitride and titanium (ZrN+Ti composite particles), and composite particles of zirconium nitride, aluminum and titanium (ZrN+Al+Ti composite particles) in ethanol by use of ultrasonic waves, measuring the transmittance with a UV-visible spectrophotometer in each case, and determining the absorbance based on the measured transmittance.

The absorbance of the fine particles of zirconium nitride is represented by a measurement line 50 in FIG. 2, and the absorbance at or around the i-line of 365 nm wavelength is low.

The aluminum content of the composite particles of zirconium nitride and aluminum is 6.1 wt %, and the absorbance thereof is represented by a measurement line 60 in FIG. 2. The titanium content of the composite particles of zirconium nitride and titanium is 5.9 wt %, and the absorbance thereof is represented by a measurement line 62 in FIG. 2. Of the composite particles of zirconium nitride, aluminum and titanium, the aluminum content is 2.9 wt %, the titanium content is 2.3 wt %, and the absorbance is represented by a measurement line 64 in FIG. 2.

As shown in FIG. 2, the fine particles of zirconium nitride have a low absorbance in a range of wavelengths shorter than 400 nm and can transmit a large amount of light at or around the i-line of 365 nm wavelength (Ultraviolet range). The absorbance thereof is high in the visible light range. The fine particles of zirconium nitride have the optical characteristics that the transmittance in the Ultraviolet range is high and the transmittance in the visible light range is low.

The composite particles of zirconium nitride and aluminum represented by the measurement line 60, the composite particles of zirconium nitride and titanium represented by the measurement line 62, and the composite particles of zirconium nitride, aluminum and titanium represented by the measurement line 64 each have the optical characteristics that the absorbance in the visible light range is higher, that is, the transmittance in the visible light range is lower as compared to the fine particles of zirconium nitride represented by the measurement line 50, and therefore have higher light-shielding properties in the visible light range.

As can be seen in FIG. 2, by combining ZrN and at least one of Ti and Al, the absorbance in the visible light range can be changed from that of ZrN alone.

Figure 3:
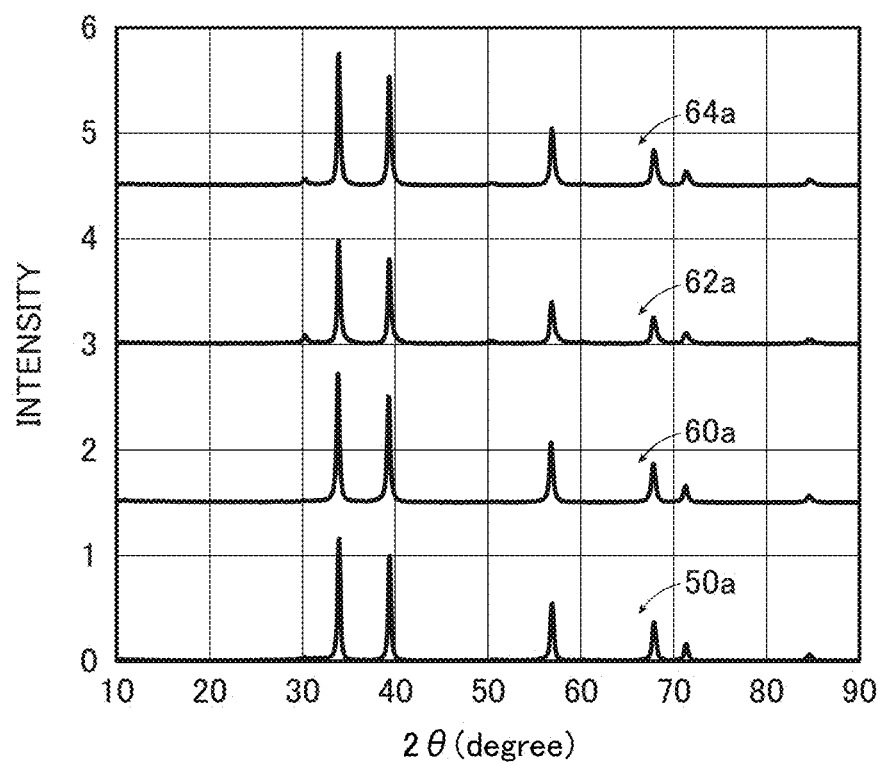
FIG. 3 is a graph showing analysis results of crystal structures of fine particles of zirconium nitride, composite particles of zirconium nitride and aluminum, composite particles of zirconium nitride and titanium, and composite particles of zirconium nitride, aluminum and titanium, obtained by the X-ray diffraction.

FIG. 3 is a graph showing analysis results of crystal structures of the fine particles of zirconium nitride, the composite particles of zirconium nitride and aluminum, the composite particles of zirconium nitride and titanium, and the composite particles of zirconium nitride, aluminum and titanium, which are obtained by the X-ray diffraction, with the unit of the intensity on the vertical axis being dimensionless.

An XRD spectrum 50a shown in FIG. 3 is a spectrum of the composite particles with the composition represented by the measurement line 50 shown in FIG. 2, an XRD spectrum 60a is a spectrum of the composite particles with the composition represented by the measurement line 60 shown in FIG. 2, an XRD spectrum 62a is a spectrum of the composite particles with the composition represented by the measurement line 62 shown in FIG. 2, and an XRD spectrum 64a is a spectrum of the composite particles with the composition represented by the measurement line 64 shown in FIG. 2. It can be seen from FIG. 3 that combining Al to ZrN leads to ZrN that is a simple substance.

Figure 4:
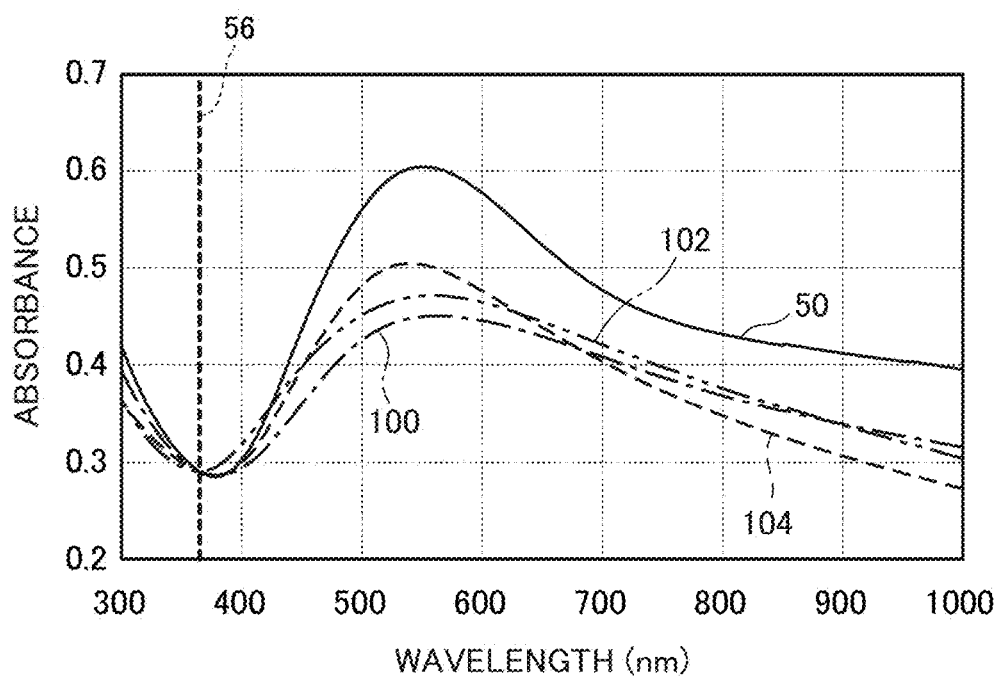
FIG. 4 is a graph showing absorbances of fine particles of zirconium nitride, composite particles of zirconium nitride and aluminum, composite particles of zirconium nitride and titanium, and composite particles of zirconium nitride, aluminum and titanium.

FIG. 4 is a graph showing absorbances of the fine particles of zirconium nitride, the composite particles of zirconium nitride and aluminum, the composite particles of zirconium nitride and titanium, and the composite particles of zirconium nitride, aluminum and titanium. In FIG. 4, the horizontal axis indicates the wavelength, and the vertical axis indicates the absorbance. The absorbances represented by measurement lines in FIG. 4 were normalized by the absorbance values at the i-line (wavelength of 365 nm). In FIG. 4, numeral 56 is given to the line representing the wavelength of 365 nm (i-line).

A measurement line 100 in FIG. 4 represents the absorbance of composite particles of zirconium nitride and titanium with a titanium content of 12 wt %. A measurement line 102 represents the absorbance of composite particles of zirconium nitride, aluminum and titanium with an aluminum content of 7.6 wt % and a titanium content of 6.7 wt %. A measurement line 104 represents the absorbance of composite particles of zirconium nitride and aluminum with an aluminum content of 19.7 wt %.

The composite particles with a titanium content of 12 wt % (measurement line 100), the composite particles with an aluminum content of 7.6 wt % and a titanium content of 6.7 wt % (measurement line 102), and the composite particles with an aluminum content of 19.7 wt % (measurement line 104) each have lower absorbance in the visible light range and thus lower light-shielding properties as compared to the measurement line 50 of the ZrN fine particles. Thus, the absorbance, i.e., the light-shielding properties can be changed by changing the type and the content of the element to be combined.

The absorbances shown in FIG. 4 are values obtained by separately dispersing the fine particles of zirconium nitride (ZrN fine particles), the composite particles with a titanium content of 12 wt % (ZrN+Ti composite particles), the composite particles with an aluminum content of 7.6 wt % and a titanium content of 6.7 wt % (ZrN+Al+Ti composite particles), and the composite particles with an aluminum content of 19.7 wt % (ZrN+Al composite particles) in ethanol by use of ultrasonic waves, measuring the transmittance with a UV-visible spectrophotometer in each case, and determining the absorbance based on the measured transmittance.

As shown in FIGS. 2 and 4, when Al is combined to ZrN for the reason that the absorbance at or around the i-line (Ultraviolet range) can be reduced while the transmittance in the visible light range further decreases and thus higher light-shielding properties can be achieved in the visible light range, the Al content is preferably not more than 9 wt %, and the Al content is preferably 0.1 to 9 wt %.

When Ti is combined to ZrN for the reason that the absorbance at or around the i-line (Ultraviolet range) can be reduced while the transmittance in the visible light range further decreases and thus higher light-shielding properties can be achieved in the visible light range, the Ti content is preferably less than 9 wt %, and the Ti content is preferably 0.1 to 9 wt %.

When Ti and Al are combined to ZrN for the reason that the absorbance at or around the i-line (Ultraviolet range) can be reduced while the transmittance in the visible light range further decreases and thus higher light-shielding properties can be achieved in the visible light range, the Ti content is preferably not more than 4 wt %, the Al content is preferably not more than 4 wt %, and the Al content and the Ti content are each preferably 0.1 to 4 wt %.

The application of the composite particles is described below. The composite particles are usable in the applications that require blocking of light in the visible light range, such as use in a black matrix of a liquid crystal display device and an organic EL display device. In some of such applications, a pattern is formed on a substrate using a photolithographic technology, and a photoresist resin used to form a pattern by utilizing the i-line that is one of emission lines of a high pressure mercury lamp is popular. When the composite particles are dispersed in a photoresist resin, the composite particles do not absorb the i-line and hence, does not hamper a photochemical reaction of the photoresist resin, so that a pattern having excellent light-shielding properties in the visible light range can be formed on a substrate.

The composite particles have other applications than the foregoing applications, such as use in printing ink, inkjet ink, a material for producing a photomask, a material for producing a proof for printing, an etching resist, and a solder resist.

In addition, the composite particles may be used in a catalyst carrier for example, and in this case, since the particle size can be decreased, the performance of the catalyst can be enhanced.

The composite particles may also be used in a photoelectric conversion element and a photothermal conversion element.

The composite particles may be mixed with metal, oxide, a plastic material or the like for use as, for instance, a pigment for adjusting the color tone.

Aside from that, the composite particles may be utilized in production of sintered bodies for use as electrical insulation materials for semiconductor substrates, printed circuit boards and various electrical insulation parts, materials for high-hardness and high-precision machining tools such as cutting tools, dies and bearings, functional materials for grain boundary capacitors and humidity sensors, and precision sinter molding materials, production of thermal sprayed parts such as engine valves made of materials that are required to be wear-resistant at a high temperature, and production of electrode, or electrolyte materials and various catalysts for fuel cells.

In this embodiment, nitride fine particles can be formed to have nanosize, and therefore, use of those particles for, for example, a sintered body makes it possible to enhance the sintering properties, so that a sintered body with high strength can be obtained. As a result, for instance, a tool having excellent cutting properties can be obtained.

The present invention is basically configured as above. While the composite particles and the method for producing the composite particles according to the invention have been described above in detail, the invention is by no means limited to the foregoing embodiment and it should be understood that various improvements and modifications are possible without departing from the scope and spirit of the invention.

REFERENCE SIGNS LIST 10 fine particle production apparatus (production apparatus)
12 plasma torch
14 material supply device
15 primary fine particle
16 chamber
18 secondary fine particle 19 cyclone
20 collecting section
22 plasma gas supply source
24 thermal plasma flame
28 gas supply device
30 vacuum pump
50, 60, 62, 64 measurement line

The invention claimed is:

1. Composite particles in which ZrN and Al are combined in a single particle,
   wherein the composite particles have a particle size of 1 to 100 nm, and
   wherein an analysis result of the composite particles obtained by X-ray diffraction shows no peak of aluminum, and
   wherein the particle size is an average particle size measured using a BET method.

2. The composite particles according to claim 1, wherein a content of the Al is 0.1 to 9 wt %.

3. The composite particles according to claim 1, wherein when the ZrN is combined with Ti, a content of the Ti is 0.1 to 9 wt %.

4. The composite particles according to claim 1, wherein when the ZrN is combined with the Al and Ti, a content of the Al and a content of the Ti are each 0.1 to 4 wt %.

5. The composite particles according to claim 1, wherein a content of the Al is 0.1 to 6.1 wt %.

* * * * *